(12) United States Patent
le Mar

(10) Patent No.: US 9,910,868 B1
(45) Date of Patent: Mar. 6, 2018

(54) SYSTEMS AND METHODS FOR DATABASE INDEX OPTIMIZATION

(71) Applicant: Dell Software Inc., Aliso Viejo, CA (US)

(72) Inventor: Guy le Mar, McKinnon (AU)

(73) Assignee: Quest Software Inc., Aliso Viejo, CA (US)

( * ) Notice: Subject to any disclaimer, the term of this patent is extended or adjusted under 35 U.S.C. 154(b) by 519 days.

(21) Appl. No.: 14/568,386

(22) Filed: Dec. 12, 2014

(51) Int. Cl.
*G06F 17/30* (2006.01)

(52) U.S. Cl.
CPC .. *G06F 17/30289* (2013.01); *G06F 17/30321* (2013.01)

(58) Field of Classification Search
CPC ............... G06F 17/30289; G06F 17/30321
USPC .......................................................... 707/696
See application file for complete search history.

(56) References Cited

U.S. PATENT DOCUMENTS

| | | | |
|---|---|---|---|
| 5,404,510 A | 4/1995 | Smith et al. | |
| 5,701,453 A | 12/1997 | Maloney et al. | |
| 5,852,820 A * | 12/1998 | Burrows | G06F 17/30622 |
| 6,151,565 A * | 11/2000 | Lobley | G06Q 10/06 703/2 |
| 6,169,983 B1 * | 1/2001 | Chaudhuri | G06F 17/30336 |
| 7,168,025 B1 * | 1/2007 | Berkovich | G06F 17/3033 707/E17.005 |
| 7,406,477 B2 * | 7/2008 | Farrar | G06F 17/30321 |
| 8,239,369 B2 | 8/2012 | Levin | |
| 9,256,644 B1 * | 2/2016 | Spellward | G06F 17/30109 |
| 2008/0059492 A1 | 3/2008 | Tarin | |
| 2008/0140655 A1 * | 6/2008 | Hoos | G06F 17/30994 |
| 2010/0262593 A1 * | 10/2010 | Bruno | G06F 17/30312 707/715 |
| 2011/0225191 A1 * | 9/2011 | Xie | G06F 17/30631 707/775 |
| 2015/0095334 A1 * | 4/2015 | Tsuji | G06F 17/30572 707/737 |

* cited by examiner

*Primary Examiner* — Kris E Mackes
*Assistant Examiner* — Thuy T Bui
(74) *Attorney, Agent, or Firm* — Winstead PC

(57) ABSTRACT

In one embodiment, a method includes selecting a plurality of indexes of a database table, receiving an indication of a set of index pairs in the plurality of indexes that are deemed to at least partially overlap, and determining a degree of overlap between the indexes of each index pair. The method further includes determining a suggested merge relationship between the indexes of each of the index pairs. The method also includes generating an index model comprising interconnected index objects. The interconnected index objects represent the indexes of the index pairs. Interconnections between the interconnected index objects reflect the suggested merge relationship between the indexes of each index pair. Moreover, the method includes outputting a graphical representation of the index model. Additionally, the method includes allowing a user to graphically select index pairs to merge in a system-determined order.

17 Claims, 7 Drawing Sheets

300

```
-- Overlapping indxes
with indexcols as
(
select object_id as id, index_id as indid, name,
(select case keyno when 0 then null else colid end as [data()]
from sys.sysindexkeys as k
where k.id = i.object_id
and k.indid = i.index_id
order by keyno, colid
for xml path('')) as cols
from sys.indexes as i
)
select
object_schema_name(c1.id) + '.' + object_name(c1.id) as 'table',
c1.name as 'index',
c2.name as 'partialduplicate'
from indexcols as c1
join indexcols as c2
on c1.id = c2.id
and c1.indid < c2.indid
and (c1.cols like c2.cols + '%'
or c2.cols like c1.cols + '%') ;
```

FIG. 3

SYSTEMS AND METHODS FOR DATABASE INDEX OPTIMIZATION

BACKGROUND

Technical Field

The present disclosure relates generally to database management and more particularly, but not by way of limitation, to systems and methods for database index optimization.

History of Related Art

A database generally includes a collection of information or data organized in a way that computer programs can quickly access or select desired portions of the collection. A common type of database is the relational database, which stores data in logical structures called tables. Databases, including relational databases, can be accessed and modified using a database management system (DBMS). Several relational DBMS products are available from companies such as Oracle Corporation®, IBM®, and Microsoft® as well as from various open-source vendors.

One problem in a DBMS is duplicate indexes. The presence of duplicate indexes in a DBMS can result in an unnecessary performance overhead. However, it can be difficult for a database administrator (DBA) to collect information sufficient to safely merge indexes without causing unintended ramifications.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is executed by a computer system. The method includes selecting a plurality of indexes of a database table, receiving an indication of a set of index pairs in the plurality of indexes that are deemed to at least partially overlap, and determining a degree of overlap between the indexes of each index pair. The method further includes determining a suggested merge relationship between the indexes of each of the index pairs. The suggested merge relationship is variable based, at least in part, on the degree of overlap. The method also includes generating an index model comprising interconnected index objects. The interconnected index objects represent the indexes of the index pairs. Interconnections between the interconnected index objects reflect the suggested merge relationship between the indexes of each index pair. Moreover, the method includes outputting a graphical representation of the index model. Additionally, the method includes allowing a user to graphically select index pairs to merge in a system-determined order. The system-determined order is based, at least in part, on a type of each of the suggested merge relationships.

In one embodiment, an information handling system includes at least one processor, wherein the at least one processor is operable to implement a method. The method includes selecting a plurality of indexes of a database table, receiving an indication of a set of index pairs in the plurality of indexes that are deemed to at least partially overlap, and determining a degree of overlap between the indexes of each index pair. The method further includes determining a suggested merge relationship between the indexes of each of the index pairs. The suggested merge relationship is variable based, at least in part, on the degree of overlap. The method also includes generating an index model comprising interconnected index objects. The interconnected index objects represent the indexes of the index pairs. Interconnections between the interconnected index objects reflect the suggested merge relationship between the indexes of each index pair. Moreover, the method includes outputting a graphical representation of the index model. Additionally, the method includes allowing a user to graphically select index pairs to merge in a system-determined order. The system-determined order is based, at least in part, on a type of each of the suggested merge relationships.

In one embodiment, a computer-program product includes a non-transitory computer-usable medium having computer-readable program code embodied therein. The computer-readable program code is adapted to be executed to implement a method. The method includes selecting a plurality of indexes of a database table, receiving an indication of a set of index pairs in the plurality of indexes that are deemed to at least partially overlap, and determining a degree of overlap between the indexes of each index pair. The method further includes determining a suggested merge relationship between the indexes of each of the index pairs. The suggested merge relationship is variable based, at least in part, on the degree of overlap. The method also includes generating an index model comprising interconnected index objects. The interconnected index objects represent the indexes of the index pairs. Interconnections between the interconnected index objects reflect the suggested merge relationship between the indexes of each index pair. Moreover, the method includes outputting a graphical representation of the index model. Additionally, the method includes allowing a user to graphically select index pairs to merge in a system-determined order. The system-determined order is based, at least in part, on a type of each of the suggested merge relationships.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 3 illustrates an example of a database script.

DETAILED DESCRIPTION

Figure 1:
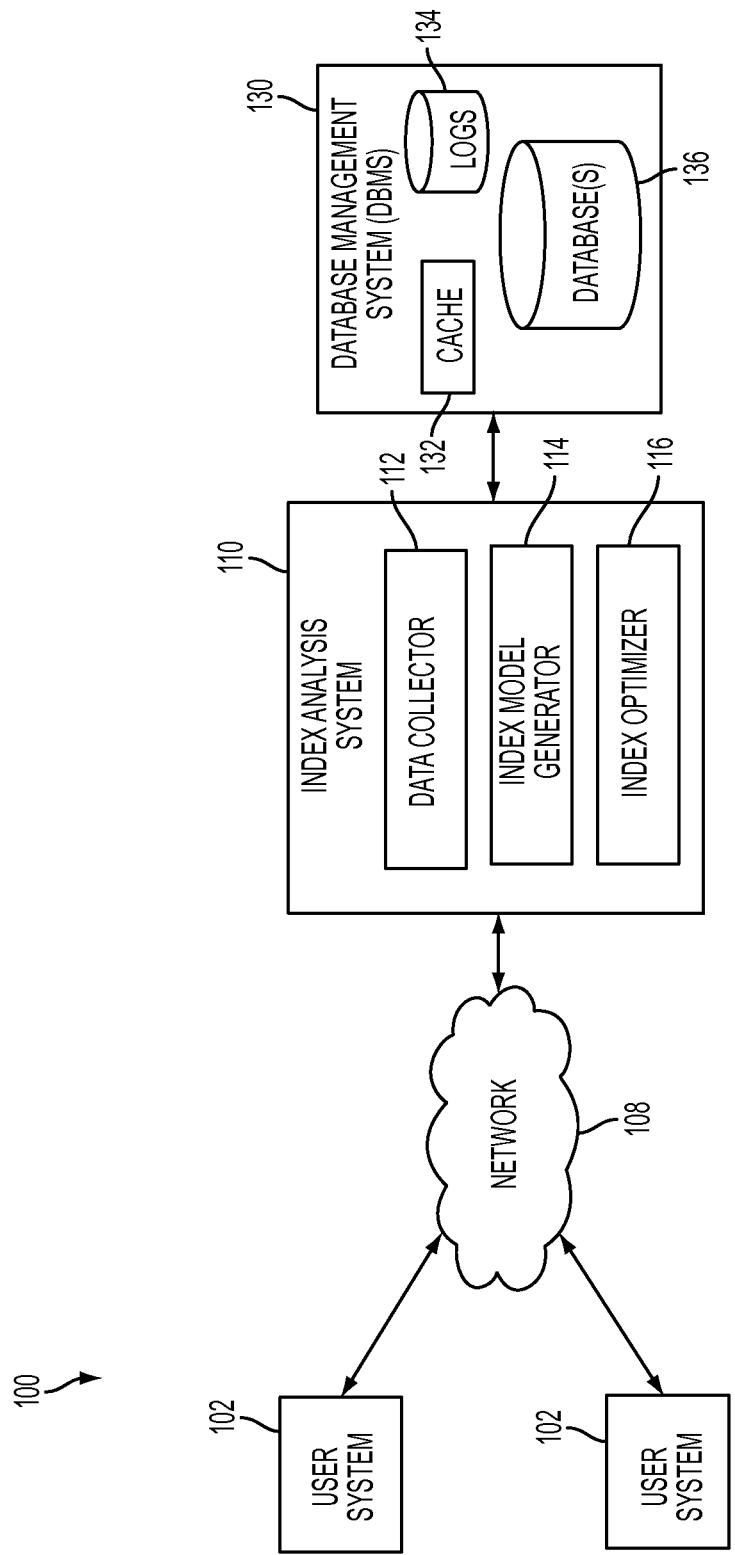
FIG. 1 illustrates an embodiment of a computing environment.

A database index can be a data structure created using one or more columns of a database table. In general, a database index provides the basis for both rapid random lookups and efficient access of ordered records. The columns of the database index may be referred to herein as "key columns." In some cases, a database index is used to quickly locate the data record(s) from which the required data is read. In these cases, the database index may only be used to locate data records in the table and not to return data and therefore might only include key columns. In other cases, a database index may include additional columns that can be used to retrieve additional data related to the key columns without accessing the table. Such additional columns may be referred to herein as "non-key columns." Selective use of non-key columns can often speed up data retrieval.

Tables in a given database management system (DBMS) can include numerous database indexes of the types described above, some of which may be at least partially duplicative. One way to detect duplicate indexes is to execute a database script (e.g., a SQL script) to detect duplicate-index-candidates (DICs). The database script can produce a list of index pairs. Afterwards, a database administrator (DBA) may manually merge some of the DICs into a single index based on his or her best judgment.

The manual-merge approach described above can have various disadvantages. In general, this approach relies on the ability or skill of the DBA to merge the indexes in such a way that database queries or statements previously utilizing these indexes are not adversely affected. In many cases, however, some database queries or statements utilizing those indexes may be unintentionally impacted. In other cases, this approach results in indexes that should be merged not being merged due to the fear of ramifications. In still other cases, new duplication can be introduced as a result of merging. For example, the DBA may attempt to resolve a duplication between index A and B by merging these two indexes into a single index C, only to later discover that new duplication has been introduced between index C and index D. Further, this approach can be slow and/or ineffective because the success or failure of merging two indexes is generally unknown until after they have been merged and the results from a subsequent analysis are available.

The present disclosure describes examples of modeling indexes as a graph so that duplicate indexes can be efficiently and effectively identified and resolved. In certain embodiments, indexes pairs, or DICs, can be graphically selected for merge in a system-determined order. Advantageously, in various embodiments, unintended ramifications of merging can be minimized due, for example, to the system-determined order in which indexes pairs are merged.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an embodiment of a computing environment 100 that provides users with access to an index analysis system 110. The index analysis system 110 is shown in communication with a database management system (DBMS) 130 and user systems 102 over a network 108. The index analysis system 110 can advantageously analyze indexes of tables of the DBMS 130. The index analysis system 110 can generate and output graphical representations of index models for presentation to DBAs or other users. As a result, users can more expeditiously and effectively analyze potentially duplicative indexes. In some embodiments, the index analysis system 110, the DBMS 130 and/or one or more user systems 102 can be implemented wholly or partially by or on information handling systems.

The example index analysis system 110 shown includes a data collector 112, an index model generator 114, and an index optimizer 116. Each of these components can be implemented in hardware and/or software. By way of overview, the data collector 112 can communicate with the depicted DBMS 130 to identify indexes of tables within the DBMS 130. Using the identified indexes, the index model generator 114 can automatically generate an index model of the identified indexes. The index optimizer 116 can generate and present a graphical representation of the index model on an index-optimization user interface, which one or more users can access via the user systems 102. The user systems 102 can access the index analysis system 110 over the network 108, or in some embodiments (not shown), locally on the user systems 102.

There are many different examples of DBMSs 130 with which the index analysis system 110 can interact. Some examples of these DBMSs 130 include Microsoft® SQL Server™, Oracle® RDBMS, MySQL™, PostgreSQL™ (Postgres™), as well as any of a variety of NoSQL (non-relational or partially relational) database systems (e.g., Cassandra™, HBase™ Microsoft® Azure Table Services™, MongoDB™, and the like). While only one DBMS 130 is shown, the index analysis system 110 can categorize statements from multiple DBMSs 130 in some embodiments.

The data collector 112 of the index analysis system 110 can collect or otherwise access information related to indexes from any of a variety of sources in the DBMS 130. Some potential sources for information, such as statement data, are shown, including a cache 132 and logs 134. Memory (such as RAM) is another potential source of index-related information. More specific data source examples include trace files, procedure caches, plan caches, and the like in Microsoft® SQL Server™ and other databases, and the system global area (SGA) in Oracle® databases, among other data sources. In addition, in some cases, the data collector 112 can also access plan data that includes execution plans for the various statements executed against the database(s) 136. Each SQL statement, for instance, can have an execution plan that reflects execution steps the DBMS 130 will take to implement the SQL statement. The data collector 112 can access the plan data from some or all of the same data sources described above. In an example, the data collector 112 can identify the indexes of a particular table of the DBMS 130. In another example, the data collector 112 can execute a database script that produces, from among the identified indexes, one or more index pairs, or DICs, as described above.

The index model generator 114 can process the index information, such as the identified indexes and the identified index pairs, to produce or generate an index model. The processing can include, for example, determining a degree of overlap between the index pairs, determining a suggested merge relationship between the index pairs, and/or other processing functionality. The suggested merge relationships can be, for example, an assessment of whether or how the indexes should be merged, information usable to make such an assessment, etc.

In certain embodiments, the index model can represent each of the identified indexes as an index object or node. The index model can further include interconnections between pairs of the index objects that correspond to the identified index pairs. In certain embodiments, the interconnections can vary based on the processing performed by the index model generator 114. For example, pairs of index objects representing different types of indexes and/or having different merge relationships can have different types of interconnections. Example operation of the index model generator 114 will be described in greater detail with respect to FIGS. 2-7. The index model generator 114 can run periodically, on-demand, and/or the like. The index model generator 114 can also or instead be executed on a DBMS 130 occasionally or periodically, for example, whenever a user wishes to optimize the database 136.

The index optimizer 116 can output an index-optimization user interface that includes a graphical representation of the index model generated by the index model generator 114. The index-optimization user interface can therefore present data to users from a simplified high level, allowing users such as DBAs to make informed decisions regarding potentially duplicative indexes. Further, in certain embodiments, the index-optimization user interface can allow users such as DBAs to graphically select index pairs to merge in a system-determined order. The index optimizer 116 can merge selected index pairs responsive to user authorization. In some cases, the merges performed by the index optimizer 116 are simulations that do not result in changes to the database 136. Example operation of the index optimizer 116 will be described in greater detail with respect to FIGS. 2-7.

Further, it should be noted that the index analysis system 110 can execute on one or more computing devices, such as one or more physical server computers. In implementations where the index analysis system 110 is implemented on multiple servers, these servers can be co-located or can be geographically separate (such as in separate data centers). In addition, the system 110 can be implemented in one or more virtual machines that execute on one or more physical servers. The index analysis system 110 can be implemented in an organization's computing environment or alternatively in the cloud (e.g., as Software-as-a-Service (SaaS) or the like). Further, it should be noted that the index analysis system 110 can analyze and model thousands upon thousands of indexes for numerous database tables, which as a practical matter, could not be accomplished in the mind of a user.

The network 108 can include a local area network (LAN), a wide area network (WAN), the Internet, or the like. For example, the network 108 can include an organization's private intranet or a combination of an intranet and the public Internet. The user systems 102 can be any of a variety of computing devices, such as desktops, laptops, tablets, smartphones, or other wireless handheld devices, to name a few. Software installed in the user systems 102, such as browser software or other client software, can enable users to access the functionality of the index analysis system 110.

Figure 2:
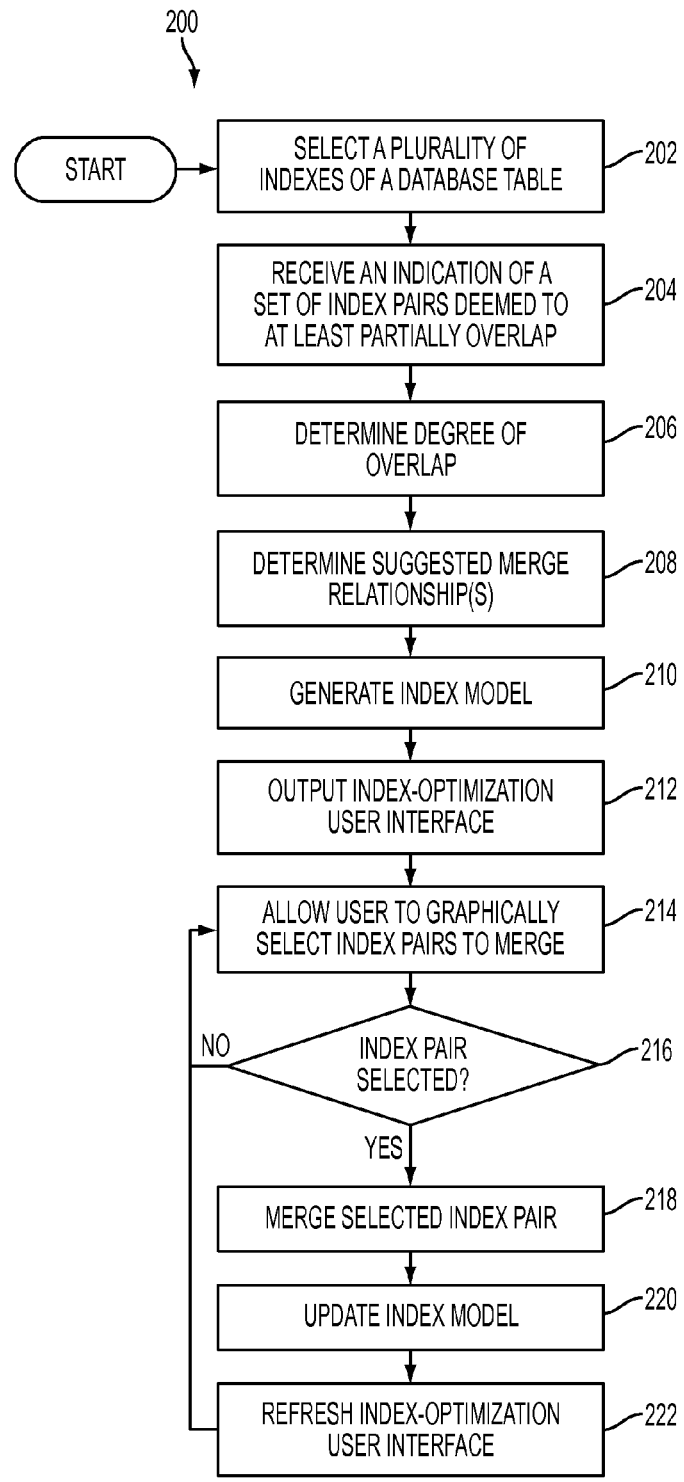
FIG. 2 illustrates an example of a process for graphically resolving duplicate indexes.

FIG. 2 illustrates an example of a process 200 for graphically resolving duplicate indexes. For example, the process 200, in whole or in part, can be implemented by one or more of the index analysis system 110, the user systems 102, the data collector 112, the index model generator 114, the index optimizer 116, and/or the DBMS 130. The process 200 can also be performed generally by the computing environment 100. Although any number of systems, in whole or in part, can implement the process 200, to simplify discussion, the process 200 will be described in relation to specific systems or subsystems of the computing environment 100.

At block 202, the index optimizer 116, or another component, selects a plurality of indexes of a table in the database 136. In many cases, the index optimizer may select all indexes of a database table. At block 204, the index model generator 114 receives an indication of a set of index pairs deemed to at least partially overlap. In an example, the data collector 112 can execute a database script to retrieve DICs as described above. According to this example, the DICs can be received from the data collector 112 as the set of index pairs that are deemed to at least partially overlap. FIG. 3 illustrates an example of a database script 300 that can be executed by the data collector 112 to yield the DICs.

At block 206, the index model generator 114 determines a degree of overlap between each of the index pairs. For example, the index model generator 114 can determine, for each index pair, how many key columns are specified in both indexes, how many non-key columns are specified in both indexes, combinations of same, and/or the like.

At block 208, the index model generator 114 determines a suggested merge relationship between each of the index pairs. In some embodiments, the suggested merge relationship can be determined for each index pair based on a type of the indexes and the degree of overlap. For example, the suggested merge relationship can be gleaned by applying categorization criteria to the indexes of each index pair. Table 1 below illustrates example criteria for determining a set of example suggested merge relationships.

TABLE 1

EXAMPLE SUGGESTED MERGE RELATIONSHIPS

| SUGGESTED MERGE RELATIONSHIP | CRITERIA |
| --- | --- |
| Full sequence match | Both indexes contain exactly the same sequence of key columns and there is no sorting discrepancy. There may or may not be a discrepancy between the non-key columns of the indexes. |
| Full sequence non-directional match | Both indexes contain exactly the same set of key columns but different sort orders (e.g. one ascending and one descending). There may or may not be a discrepancy between the non-key columns of the indexes. |
| Partial sequence match | The indexes include some, but not all, of the same set of key columns and there is no sorting discrepancy. There may or may not be a discrepancy between the non-key columns of the indexes. |

TABLE 1-continued

EXAMPLE SUGGESTED MERGE RELATIONSHIPS

| SUGGESTED MERGE RELATIONSHIP | CRITERIA |
|---|---|
| Partial sequence non-directional match | The indexes include some, but not all, of the same set of key columns but different sort orders (e.g., one ascending and one descending). There may or may not be a discrepancy between the non-key columns of the indexes. |
| Unique Index Merge Relationship | One of the indexes is a unique key and the other is not. There may or may not be a discrepancy between the non-key columns of the indexes. |

At block 210, the index model generator 114 generates an index model of the database table. The index model can represent each of the identified indexes as an index object or node. The index model can further include interconnections between pairs of the index objects that correspond to the identified index pairs. Pairs of index objects representing different types of indexes and/or having different merge relationships can have different types of interconnections. As will be described in greater detail with respect to FIGS. 2-7, the interconnections and resultant graphical depictions thereof can be particularized to the suggested merge relationships.

At block 212, the index optimizer 116 outputs an index-optimization user interface. The index-optimization user interface can include a graphical representation of the index model. At block 214, the index optimizer 116 allows a user such as a DBA to graphically select index pairs to merge. In certain embodiments, the index optimizer 116 can enforce a system-determined order at the block 214. In an example, the index optimizer 116 could require that the user follow the following order: (1) merge or ignore full sequence matches; (2) merge or ignore partial sequence matches; (3) merge or ignore full sequence non-directional matches; and (4) merge or ignore partial sequence non-directional matches.

In some embodiments, as part of the block 214, the user can be permitted to view, for example, SQL statements associated with each index represented in the graphical representation. In these embodiments, the user can see which SQL statements utilize each index. In an example, the user could select a particular index object and view information collected by the data collector 112 as described with respect to FIG. 1. In some cases, this can be an important consideration when merging indexes. For instance, it may be possible to merge two indexes whose sort-order on a column differs if the SQL statement will not incur an additional sort operation.

At decision block 216, the index optimizer 116 determines whether an index pair has been selected. If not, the process 200 returns to block 214 and operates as described above. Otherwise, if it is determined at the decision block 216 that an index pair has been selected, at block 218, the index optimizer 116 merges the indexes of the selected index pair. It should be appreciated that, in some embodiments, the merge can be a simulated merge that does not result in any changes to the indexes of the database table. In other embodiments, the merge can be automatically implemented in the database 136. To accomplish the merge, the index optimizer can add (or simulate adding) any missing key or non-key columns to a surviving index. The surviving index typically includes all columns (e.g., key and non-key) specified by either index of the index pair. The surviving index can be, for example, one of the indexes of the index pair, a new index that replaces the index pair, and/or the like.

At block 220, the index optimizer 116 updates the index model to reflect the merged indexes. At block 222, the index optimizer 116 refreshes the index-optimization user interface responsive to the update to the index model. From block 222, the process 200 returns to block 215 and proceeds as described above. In various embodiments, the process 200 can continue indefinitely until terminated by the user, all potentially duplicate indexes have been merged, ignored or otherwise explicitly addressed, other stop criteria is met, combinations of same, and/or the like. An example implementation of the process 200 will be described with respect to FIGS. 4-7 and Tables 2-3.

Although FIG. 2 describes user interaction as an example of a way in which index pairs can be merged, it should be appreciated that in some cases no user interaction may be necessary. For example, in some embodiments, certain categories of merge relationships can result in automatic merging (e.g., full sequence matches, partial sequence matches, etc.). In these embodiments, as a safeguard, SQL statements may be searched, for example, for hints referencing an index to be removed. If no SQL statements contain hints referencing the index to be removed, the merge can be permitted to occur automatically. Other variations will be apparent to one skilled in the art after reviewing the present disclosure.

Figure 4:
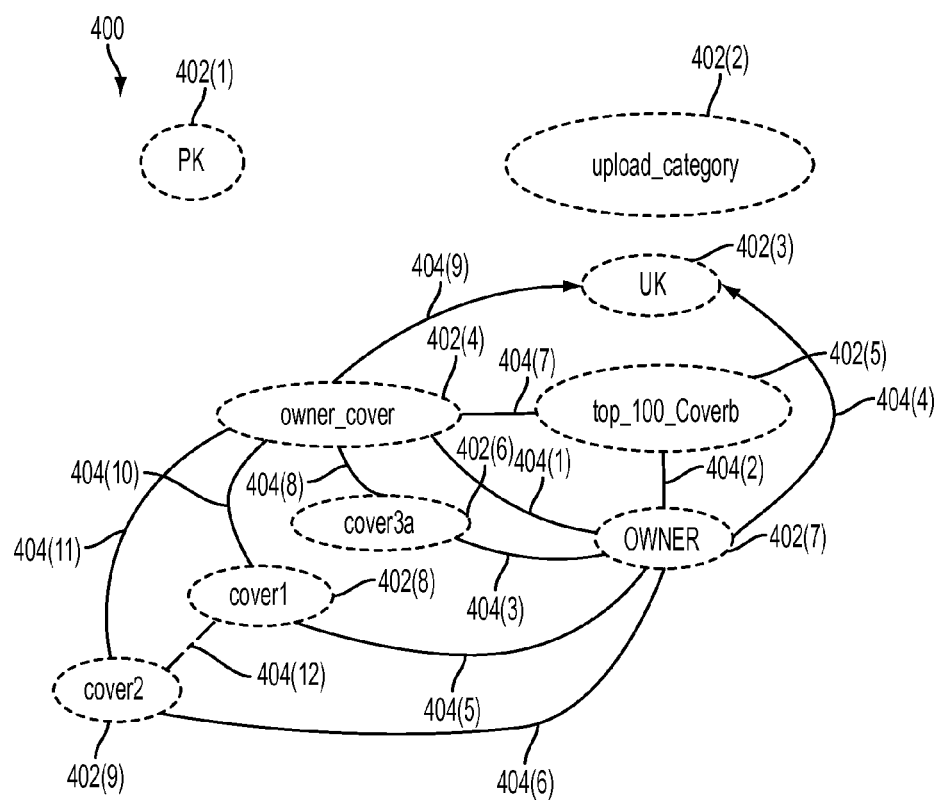
FIGS. 4-7 illustrate examples of graphical representations of an index model.

FIGS. 4-7 illustrate an example implementation of resolving potentially duplicative indexes. In particular, FIG. 4 illustrates an example of a graphical representation 400 that can result, for example, from block 212 of the process 200 of FIG. 2. The graphical representation 400 can use, for example, data from Table 2 and Table 3 below. Table 2 illustrates an example list of indexes of an example database table. Table 3 illustrates example index pairs for the example database table. The example index pairs can be received, for example, as a result of executing a database script similar to the database script 300 of FIG. 3.

TABLE 2

EXAMPLE INDEXES OF
A DATABASE TABLE

PK
upload_category
UK
owner_cover
top_100_Coverb
cover3a
Owner
cover1
cover2

TABLE 3

EXAMPLE INDEX PAIRS

| INDEX PAIR | I1 | I2 |
|---|---|---|
| P1 | Owner | owner_cover |
| P2 | Owner | top_100_coverb |
| P3 | Owner | cover3a |
| P4 | Owner | UK |
| P5 | Owner | cover1 |
| P6 | Owner | cover2 |
| P7 | owner_cover | top_100_coverb |
| P8 | owner_cover | cover3a |
| P9 | owner_cover | UK |
| P10 | owner_cover | cover1 |

TABLE 3-continued

EXAMPLE INDEX PAIRS

| INDEX PAIR | I1 | I2 |
|---|---|---|
| P11 | owner_cover | cover2 |
| P12 | cover1 | cover2 |

The graphical representation 400 includes index objects 402(1)-402(9) (collectively, index objects 402) that correspond to the indexes shown above in Table 2. The graphical representation 400 further includes interconnections 404(1)-404(12) (collectively, interconnections 404) that correspond to the example index pairs shown above in Table 3. In the depicted embodiment, the interconnections 404 each correspond to one or more of the suggested merge relationships shown above in Table 1.

In the example illustrated, the interconnection 404(12) is a full sequence match while all others of the interconnections 404 are partial sequence matches. More particularly, the interconnections 404(4) and 404(9) are shown to further relate to a unique key (i.e., the index object 402(3)). According to this example, the presence of a unique key in an index pair can mean that the non-unique key index should be merged, if at all, into the unique-key index. The interconnections 404(4) and 404(9) illustrate this example suggestion via arrows that point to the index object 402(3). In this example, the index objects 402(1) and 402(2) are not members of any index pair. Therefore, the index objects 402(1) and 402(2) are shown as having no interconnections.

It should be appreciated that, in many cases, the unique key exists to prevent duplication of data (e.g., rows) in a given database table. In addition, or alternatively, the unique key might enforce business rules which are only known to a DBA or other user. Thus, in some embodiments, merges that result in any alteration to a unique key can be automatically prevented, permitted only with DBA consent, combinations of same, and/or the like.

Figure 5:
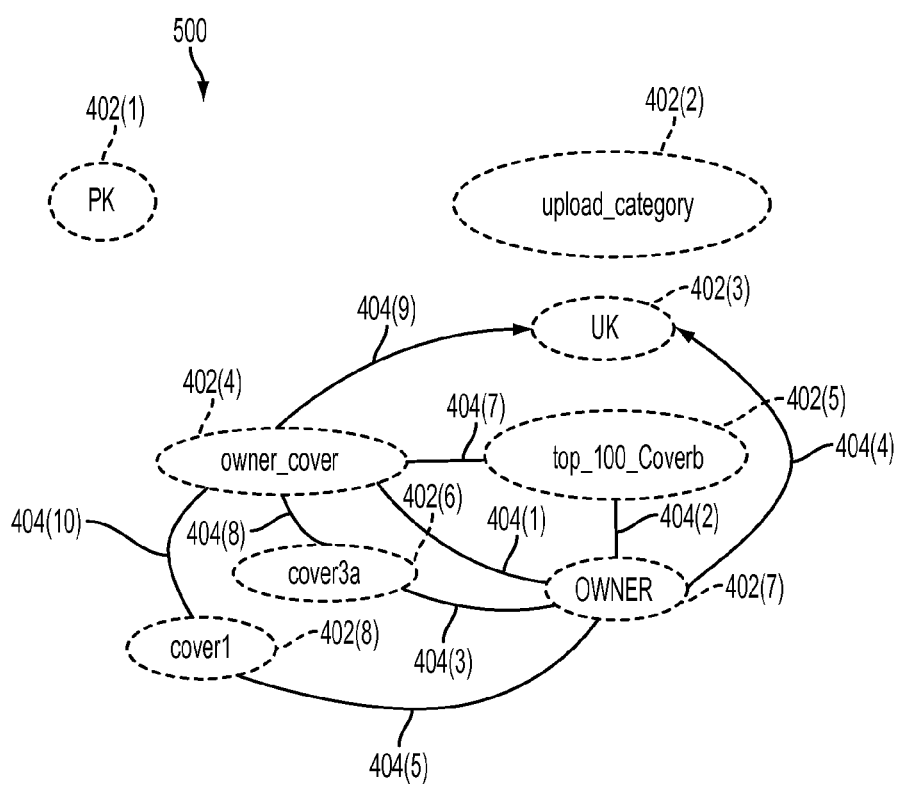

FIG. 5 illustrates an example of a graphical representation 500 that can result from a user such as a DBA selecting or otherwise authorizing merge of the indexes represented by the index objects 402(8) and 402(9). In an example, the user could authorize the merge by selecting the interconnection 404(12) in the graphical representation 400. As shown in the graphical representation 500, the merge results in removal of the index object 402(9) and its interconnections (i.e., the interconnections 404(6), 404(11), and 404(12)).

Figure 6:
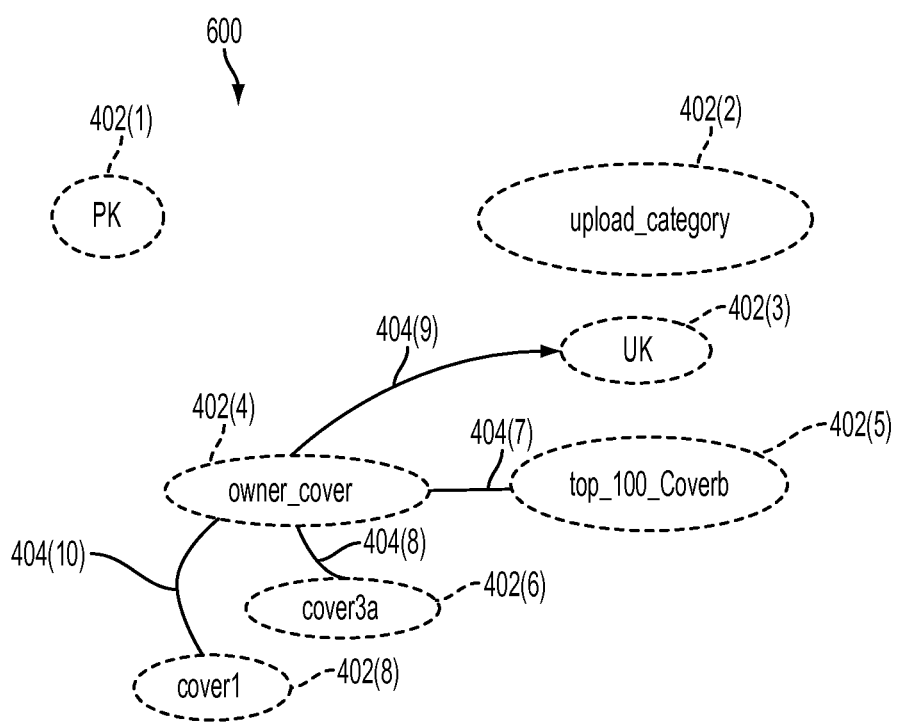

FIG. 6 illustrates an example of a graphical representation 600 that can result from a user such as a DBA selecting or otherwise authorizing merge of the indexes represented by the index objects 402(3) and 402(7). The index object 402(7) is shown to be merged into the index object 402(3) since the index object 402(3) represents a unique-key index. In an example, the user could authorize the merge by selecting the interconnection 404(4) in the graphical representation 500. As shown in the graphical representation 600, the merge results in removal of the index object 402(7) and its remaining interconnections (i.e., the interconnections 404(1), 404(2), 404(3), 404(4), and 404(5)).

Figure 7:
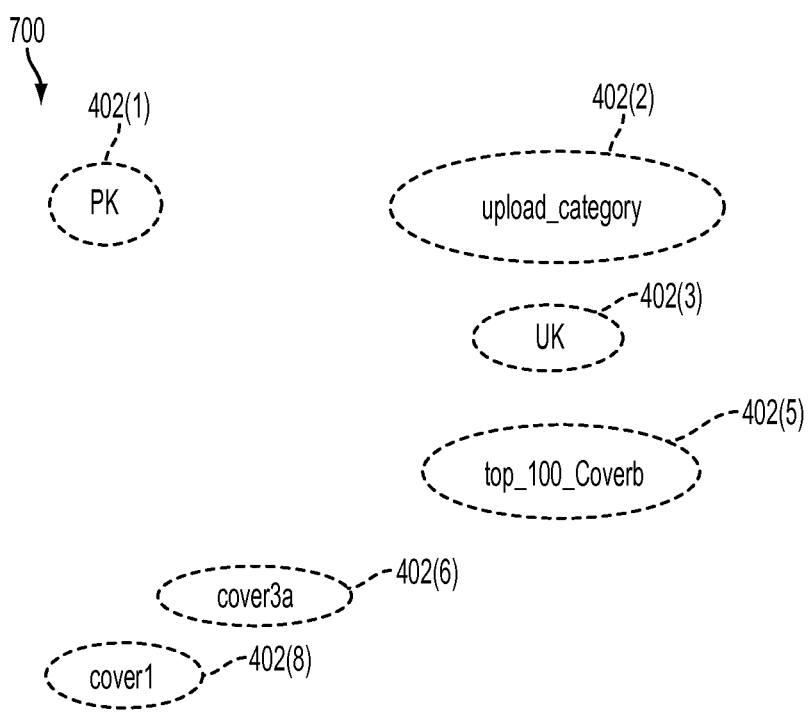

FIG. 7 illustrates an example of a graphical representation 700 that can result from a user such as a DBA selecting or otherwise authorizing merge of the indexes represented by the index objects 402(3) and 402(4). The index object 402(4) is shown to be merged into the index object 402(3) since the index object 402(3) represents a unique-key index. In an example, the user could authorize the merge by selecting the interconnection 404(9) in the graphical representation 600.

As shown in the graphical representation 700, the merge results in removal of the index object 402(4) and its remaining interconnections (i.e., the interconnections 404(7), 404(8), 404(9), and 404(10)). The graphical representation 700 shows no interconnections. In that way, the graphical representation 700 illustrates a graphical resolution to duplicate indexes originally depicted by the graphical representation 400 of FIG. 4.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   selecting a plurality of indexes of a database table;
   receiving an indication of a set of index pairs in the plurality of indexes that are deemed to at least partially overlap;
   determining a degree of overlap between the indexes of each index pair of the set of index pairs;
   determining a suggested merge relationship between the indexes of each of the index pairs, wherein the suggested merge relationship is variable based, at least in part, on the degree of overlap, wherein, for at least one index pair of the set of index pairs, the indexes of the at least one index pair include some but not all of the same columns;
   generating an index model comprising interconnected index objects, the interconnected index objects representing the indexes of the index pairs, wherein interconnections between the interconnected index objects reflect the suggested merge relationship between the indexes of each index pair;

outputting a graphical representation of the index model;

allowing a user to graphically select index pairs to merge in a system-determined order, wherein the system-determined order is based, at least in part, on a type of each of the suggested merge relationships;

merging the at least one index pair responsive to user authorization, the at least one index pair comprising a surviving index and a non-surviving index, the merging comprising adding, to the surviving index, columns of the non-surviving index that are missing from the surviving index;

automatically updating the index model to reflect the merged at least one index pair; and automatically outputting an updated graphical representation of the automatically updated index model.

2. The method of claim 1, wherein the merging comprises a simulation that results in no changes to the database table.

3. The method of claim 1, comprising, responsive to the automatically outputting, again allowing the user to graphically select index pairs to merge in the system-determined order.

4. The method of claim 1, wherein the index model comprises one or more non-interconnected index objects, the one or more non-interconnected index objects representing one or more indexes of the plurality of indexes that are not included in any of the index pairs.

5. The method of claim 1, wherein the allowing of the user to graphically select index pairs to merge in the system-determined order comprises allowing the user to make decisions regarding index pairs to merge in the following order:
   each index pair that is a full sequence match;
   each index pair that is a partial sequence match;
   each index pair that is a full-sequence non-directional match; and
   each index pair that is a partial-sequence non-directional match.

6. The method of claim 1, wherein the receiving of the indication results from execution of a database script.

7. The method of claim 1, wherein the suggested merge relationship is selected from the group consisting of: a full sequence match, a partial sequence match, a full sequence non-directional match, and a partial sequence non-directional match.

8. An information handling system comprising a computer processor and memory, wherein the computer processor and memory in combination are operable to implement a method comprising:
   selecting a plurality of indexes of a database table;
   receiving an indication of a set of index pairs in the plurality of indexes that are deemed to at least partially overlap;
   determining a degree of overlap between the indexes of each index pair of the set of index pairs;
   determining a suggested merge relationship between the indexes of each of the index pairs, wherein the suggested merge relationship is variable based, at least in part, on the degree of overlap, wherein, for at least one index pair of the set of index pairs, the indexes of the at least one index pair include some but not all of the same columns;
   generating an index model comprising interconnected index objects, the interconnected index objects representing the indexes of the index pairs, wherein interconnections between the interconnected index objects reflect the suggested merge relationship between the indexes of each index pair;
   outputting a graphical representation of the index model;
   allowing a user to graphically select index pairs to merge in a system-determined order, wherein the system-determined order is based, at least in part, on a type of each of the suggested merge relationships;
   merging the at least one index pair responsive to user authorization, the at least one index pair comprising a surviving index and a non-surviving index, the merging comprising adding, to the surviving index, columns of the non-surviving index that are missing from the surviving index;
   automatically updating the index model to reflect the merged at least one index pair; and
   automatically outputting an updated graphical representation of the automatically updated index model.

9. The information handling system of claim 8, wherein the merging comprises a simulation that results in no changes to the database table.

10. The information handling system of claim 8, the method comprising, responsive to the automatically outputting, again allowing the user to graphically select index pairs to merge in the system-determined order.

11. The information handling system of claim 8, wherein the index model comprises one or more non-interconnected index objects, the one or more non-interconnected index objects representing one or more indexes of the plurality of indexes that are not included in any of the index pairs.

12. The information handling system of claim 8, wherein the allowing of the user to graphically select index pairs to merge in the system-determined order comprises allowing the user to make decisions regarding index pairs to merge in the following order:
   each index pair that is a full sequence match;
   each index pair that is a partial sequence match;
   each index pair that is a full-sequence non-directional match; and
   each index pair that is a partial-sequence non-directional match.

13. The information handling system of claim 8, wherein the receiving of the indication results from execution of a database script.

14. The information handling system of claim 8, wherein the suggested merge relationship is selected from the group consisting of: a full sequence match, a partial sequence match, a full sequence non-directional match, and a partial sequence non-directional match.

15. A computer-program product comprising a non-transitory computer-usable medium having computer-readable program code embodied therein, the computer-readable program code adapted to be executed to implement a method comprising:
   selecting a plurality of indexes of a database table;
   receiving an indication of a set of index pairs in the plurality of indexes that are deemed to at least partially overlap;
   determining a degree of overlap between the indexes of each index pair of the set of index pairs;
   determining a suggested merge relationship between the indexes of each of the index pairs, wherein the suggested merge relationship is variable based, at least in part, on the degree of overlap, wherein, for at least one index pair of the set of index pairs, the indexes of the at least one index pair include some but not all of the same columns;

generating an index model comprising interconnected index objects, the interconnected index objects representing the indexes of the index pairs, wherein interconnections between the interconnected index objects reflect the suggested merge relationship between the indexes of each index pair;

outputting a graphical representation of the index model;

allowing a user to graphically select index pairs to merge in a system-determined order, wherein the system-determined order is based, at least in part, on a type of each of the suggested merge relationships;

merging the at least one index pair responsive to user authorization the at least one index pair comprising a surviving index and a non-surviving index, the merging comprising adding, to the surviving index, columns of the non-surviving index that are missing from the surviving index;

automatically updating the index model to reflect the merged at least one index pair; and automatically outputting an updated graphical representation of the automatically updated index model.

16. The computer-program product of claim 15, wherein the merging comprises a simulation that results in no changes to the database table.

17. The computer-program product of claim 15, the method comprising, responsive to the automatically outputting, again allowing the user to graphically select index pairs to merge in the system-determined order.

* * * * *